United States Patent
Nagan

[11] Patent Number: 5,342,539
[45] Date of Patent: Aug. 30, 1994

[54] POLYACRYLAMIDE-PHOSPHONATE FLOCCULANTS AND METHODS OF MAKING

[75] Inventor: Leo E. Nagan, Mercer Island, Wash.

[73] Assignee: Diatec Polymers, doing business as Diatec Environmental, Batavia, Ill.; a part interest

[21] Appl. No.: 14,845

[22] Filed: Feb. 8, 1993

[51] Int. Cl.$^5$ .................. C02F 1/56; C08F 20/56; C08F 6/06
[52] U.S. Cl. .................. 252/180; 210/734; 525/329.4; 528/487
[58] Field of Search ........ 525/329.4; 528/487; 252/180, 181; 210/699, 700, 734

[56] References Cited

U.S. PATENT DOCUMENTS

| | | | |
|---|---|---|---|
| 4,120,840 | 10/1978 | Hurlock et al. | 523/335 |
| 4,230,608 | 10/1980 | Mura | 523/337 |
| 4,277,359 | 7/1981 | Lipinski | 210/699 |
| 4,443,340 | 4/1984 | May et al. | 210/698 |
| 4,446,028 | 5/1984 | Becker | 210/697 |
| 4,446,046 | 5/1984 | Becker | 252/181 |
| 4,499,002 | 2/1985 | Masler, III et al. | 252/180 |
| 4,566,973 | 1/1986 | Masler, III et al. | 210/701 |
| 4,650,591 | 3/1987 | Boothe et al. | 210/700 |
| 4,702,849 | 10/1987 | Penny | 252/8.554 |
| 4,708,815 | 11/1987 | Chen et al. | 252/181 |
| 4,857,205 | 8/1989 | Redmore et al. | 210/700 |
| 4,863,614 | 9/1989 | Chen et al. | 210/699 |
| 4,874,588 | 10/1989 | Sortwell et al. | 422/269 |
| 4,880,007 | 11/1989 | Sadler et al. | 128/653 |
| 4,886,617 | 12/1989 | Chen et al. | 252/180 |
| 4,904,413 | 2/1990 | Hoots et al. | 252/389.23 |
| 5,023,368 | 6/1991 | Leighton et al. | 560/195 |
| 5,069,798 | 12/1991 | Hwa et al. | 210/700 |

FOREIGN PATENT DOCUMENTS 50-72987 6/1975 Japan .

OTHER PUBLICATIONS

Haruta, et al., *Chemical Abstracts*, 83:20, Abstract No. 164855x (1975).
Moedritzer, et al., *J. Organic Chem.*, 31:1603–1607 (1966).
Shalaby, et al., editors, ACS *Symposium Series* 467, "Water Soluble Properties: Synthesis, Solution Properties and Applications," pp. 45–46 (1991).

*Primary Examiner*—Neil McCarthy
*Attorney, Agent, or Firm*—Marshall, O'Toole, Gerstein, Murray & Borun

[57] ABSTRACT

Artionic water treatment polymers are obtained by reacting polyacrylamide and phosphorous acid.

17 Claims, 1 Drawing Sheet

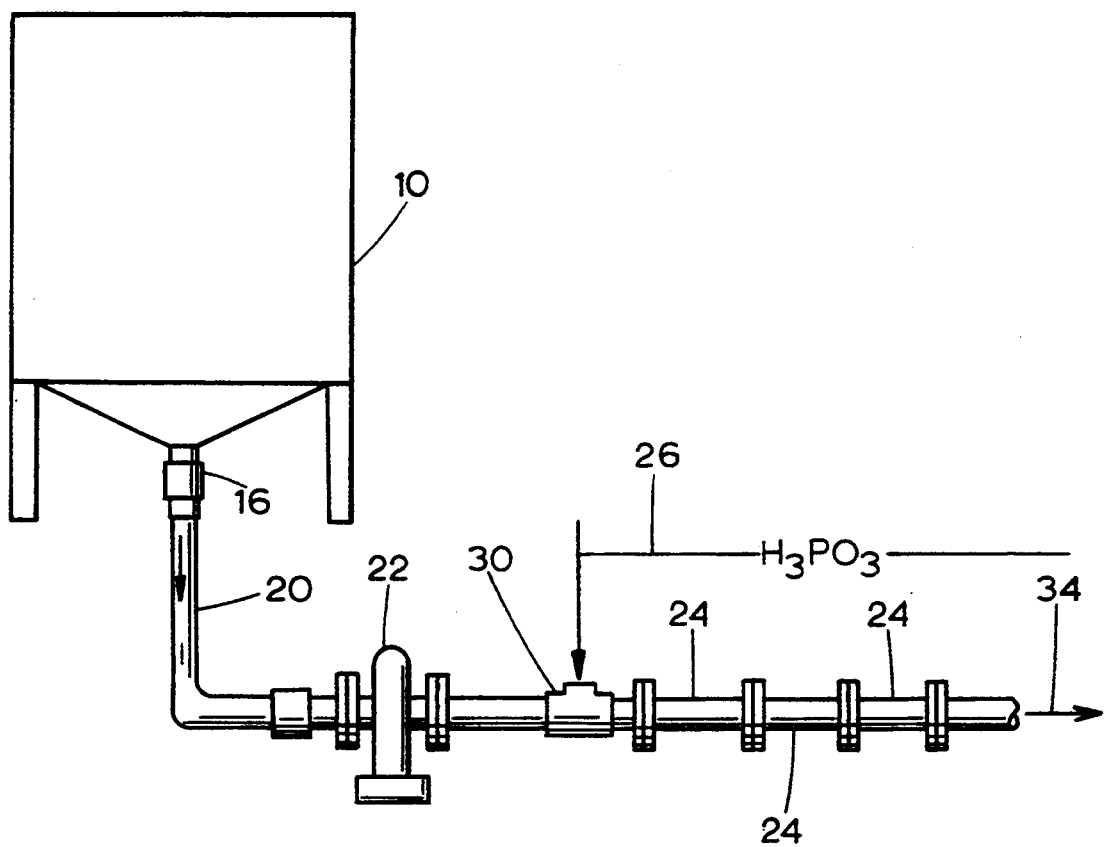

POLYACRYLAMIDE-PHOSPHONATE FLOCCULANTS AND METHODS OF MAKING

BACKGROUND OF THE INVENTION

1. Field of the Invention

The invention relates generally to water treatment polymers and, more particularly, the invention relates to anionic polymers useful as flocculants and methods of preparing and using the same.

2. Description of Related Technology

Considerable expenditures are made each year for materials used in water treatment, such as flocculants and coagulants used to clarify raw waters for potable and industrial use. Flocculants are used to clarify municipal and industrial effluents to remove pollutants and to improve the efficiency of papermaking processes by increasing the first pass retention of fiber and filler when paper is formed on a paper machine and for other process clarification needs. Therefore, the demand for more efficient, inexpensive water treatment compositions for use as flocculants is increasing.

Artionic high molecular weight polymers are widely used as flocculants to clarify waters for potable and industrial use. Some commercially available anionic polymers include pendant carboxyl units connected to a backbone chain. These units function as active sites for linking with solid particles suspended in the water to be treated. The active carboxyl units along the chain begin to become deprotonated at about pH 4.6 and deprotonation increases as pH increases. Accordingly, the deprotonated sites become anionic, exhibiting a single negative charge per carboxyl pendant. In the flocculant-type applications described above, it would therefore be advantageous to increase the negative charges per active pendant unit to increase polymer activity and efficiency.

In water stabilization applications, the use of phosphono-methylated amine compounds to sequester polyvalent metal ions, especially calcium and magnesium, has been the subject of investigation for many years. It has been found that four phosphono units can be attached to a diamine base while five phosphono units may be attached to a triamine base to provide additional sequestering ability. Amine-based phosphonates have enjoyed commercial success as sequesterants and chelating agents in industrial systems needing control over such metal ions as calcium, magnesium, iron, and manganese.

In the past, a Mannich-type reaction has been used to prepare phosphono-methylated amines using phosphorous acid, formaldehyde and ammonia or amine compounds. See Moedritzer & Irani, *J. Org. Chem.*, 31, 1603–1607 (1966). It has also been disclosed that certain polymers containing phosphonate units may be copolymerized with other materials such as acrylamide, acrylic acid and acrylates to produce scale and corrosion inhibitors for water systems such as cooling, f boiler and gas scrubbing systems. See Becker, U.S. Pat. No. 4,446,028 (May 1, 1984) and Hoots et al., U.S. Pat. No. 4,904,413 (Feb. 27, 1990).

SUMMARY OF THE INVENTION

It is an object of the invention to overcome one or more of the problems described above.

The invention comprehends the product of the reaction between an acrylamide polymer and phosphorous acid. The invention also comprehends methods of preparing water treatment compositions comprising reacting an acrylamide polymer with phosphorous acid and water treatment methods utilizing such inventive compositions.

Other objects and advantages of the invention will be apparent to those skilled in the art and from the following detailed description, taken in conjunction with the drawing and the appended claims.

BRIEF DESCRIPTION OF THE DRAWING

The sole FIGURE is a schematic view of an apparatus suitable for carrying out a method of preparing the inventive polymers.

DETAILED DESCRIPTION OF THE INVENTION

Anionic polymers according to the invention, which exhibit a surprisingly high charge density and are thus useful for flocculation, are prepared by adding phosphorous acid to an acrylamide polymer. This results in the creation of a polyacrylamide-phosphonic acid material comprising repeat phosphono pendants which are believed to attach to the amide groups of the polyacrylamide backbone. A phosphono pendant is defined herein by the following formula:

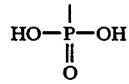

When fully deprotonated, the phosphono pendants are transformed into phosphonate pendants, each having two negative sites, i.e., twice the anionic charge per pendant as carboxylated flocculants. Therefore, the inventive flocculants display superior activity in applications having pH levels of about 7.7 (where double deprotonation is believed to begin) and above. The flocculants remarkably accelerate the sedimentation of sludge and produce excellent water clarity. At lower pH levels where only single deprotonation per active site is expected, the inventive flocculants at least match the performance of carboxylated flocculants.

The inventive polymers are preferably prepared by a reaction in which an aqueous solution of an acrylamide polymer is mixed with phosphorous acid. The reaction takes place under acidic conditions, preferably at a pH ranging between about 1 and about 2. The reaction appears to be essentially instantaneous or occurring within a few seconds at reaction temperatures ranging between about 34° F. and about 200° F. The reaction may take place in either a batch or continuous reactor.

A reaction system for preparing the polymers of the invention is shown in the figure. An aqueous solution of acrylamide polymer is located in a holding tank 10 having a discharge outlet 16. The aqueous solution of acrylamide polymer may be prepared utilizing a reaction system described in Sortwell et al., U.S. Pat. No. 4,874,588 (Oct. 17, 1989), the disclosure of which is incorporated by reference herein. The polymer solution may be removed through the outlet 16 and through a line 20 and pumped, as by a lobe pump 22, through a series of static in-line mixers 24. Phosphorous acid ($H_3PO_3$) may be introduced into the line 20 through a line 26 which joins the line 20 at a T-union 30. (The phosphorous acid is metered through a metering pump (not shown) in the line 26.) The product is removed at 34 for direct use or to another receptacle for storage. Prior to use, the product may be diluted with water.

In another embodiment, the phosphorous acid is not introduced into the line 20 and the dissolved acrylamide polymer is removed at 34 and sent to a storage tank for subsequent metering to an application area. As described more fully below, both the dissolved acrylamide polymer and the phosphorous acid are then metered to a in-line mixer for reaction just prior to being applied to a system to be flocculated.

A preferred acrylamide polymer starting material for the flocculants of the invention is an aqueous solution of an acrylamide homopolymer. However, the acrylamide polymer starting material may be another acrylamide polymer, such as an aqueous solution of methacrylamide homopolymer or a copolymer of acrylamide and methacrylamide, acrylate or metal salts of acrylic acid, for example. The acrylamide polymer may be partially hydrolyzed.

It has been found that maximum activity from the flocculants according to the invention results when the pH of the flocculant is adjusted to range between about 7.7 and about 8.4 (pH range of about 8 to about 8.2 is particularly preferred) immediately before the flocculant is applied to the slurry to be flocculated. It has also been found that high concentrations of hydroxide lower the stability of the flocculant molecule. Therefore, a preferred flocculant according to the invention is prepared by adjusting the pH of the water to be used for polymer dilution to a pH high enough so that the pH of the diluted polymer is about 8.2. This is preferred over simply adding a strong caustic solution to the diluted polymer (which could cause localized high hydroxide concentrations) until the polymer and water are thoroughly mixed. By adding the hydroxide to the dilution water, localized high hydroxide levels in the flocculant are avoided.

It is believed that adjusting the pH of the dilution water prior to mixing with the flocculant accomplishes at least two objectives. First, the pH of approximately 8.2 assures double deprotonation of the phosphonate pendant at the time it is added to the aqueous system to be treated to promote immediate flocculating action. Secondly, the double deprotonation of the flocculant is believed to help ensure maximum polymer molecule linear extension. It is known that a linearly extended polymer molecule is more effective than one which is fully or partially coiled at the time it is added to the system to be treated. It is believed that at higher pH levels the molecules of the inventive flocculant extend because of the mutually repellant nature of the highly anionic pendants.

A particularly preferred process according to the invention includes storing a polyacrylamide solution and a phosphorous acid solution in separate tanks, metering the two solutions in ratios appropriate for a particular flocculant application to a highly efficient in-line mixer where a polyacrylamidephosphonate complex is formed, and thereafter diluting the mixture. Prior to the dilution step, the pH of the dilution water is adjusted so that the diluted flocculant will have a pH ranging from about 8.0 to about 8.4 and preferably about 8.2. The pH-adjusted dilution water is preferably mixed with the flocculant in a highly efficient in-line mixer.

It has been found that a caustic solution can be added directly to a diluted or undiluted flocculant of the invention in order to adjust the pH thereof and such a flocculant will outperform carboxylated anionic polymers in terms of speed of flocculation and clarity of the resulting supernatant. However, such a flocculant will not perform as well as a similar one in which the pH of the dilution water is adjusted prior to dilution of the polymer.

It is preferred that the inventive flocculants be prepared shortly before use. It has been found that an extended storage time may result in a breakdown of the polyacrylamide-phosphonate complex (the higher the pH the more rapid the breakdown). Tests to date indicate excellent performance of such flocculants compared to carboxylate polymers for one to two days after preparation with activity declining to that of simple polyacrylamides over a period of about seven days.

Preferred flocculants and coagulants according to the invention are made with about a 0.2 to about a 50 wt. % solution (about 0.2 to about 6 wt % solution is preferred and a 2 wt. % solution is particularly preferred) of an acrylamide homopolymer having a molecular weight ranging from about 40,000 to about 18,000,000 (particularly preferred about 5,000,000 to about 11,000,000) as measured by an intrinsic viscosity of about 0.1 to about 28 (particularly preferred about 12 to about 14). The maximum polymer solids level is limited only by the ability of the polymer to quickly obtain a homogeneous mixture with the phosphorous acid. The amount of phosphorous acid in the reaction mixture preferably ranges between about 5 mole % and about 200 mole based upon the acrylamide content of the polymer backbone. A range of about 20–80 mole % phosphorous acid is preferred and a particularly preferred range is about 20–50 mole % based upon the acrylamide polymer backbone.

The flocculants of the invention are efficient in treating materials that have a cationic charge, either naturally or imposed thereon by treatment with, for example, quaternary amines, aluminum salts or iron salts. The inventive flocculants provide good activity in applications having pH levels of about 5.6 and above and superior activity in applications having pH levels of about (where double deprotonation is believed to begin) and above. A highly preferred pH range is between about 8 and about 8.4.

The double negative charge per phosphonate pendant provided by the inventive polymers gives especially good activity wherever calcium, magnesium, iron, barium, manganese, zinc or other metal ions are present, whether as a part of inorganic particles or present on the surface of fibers, colloids, or organic particles via an adsorption phenomenon such as ion exchange. Where metal ions such as calcium or magnesium are not present on the surface of the materials to be flocculated, they can be added upstream of the flocculant addition point where they can adsorb onto the surface of the materials to be removed by clarification. For example, calcium or magnesium chloride may be added to raw water prior to flocculation. Seawater may be used to provide the source of magnesium and calcium.

An example of a field of application highly suited to the use of a high molecular weight polymer of the invention is in the papermaking industry where calcium carbonate is used as a filler in the manufacture of so-called alkaline-sized papers. The effective equilibrium pH of a calcium carbonate saturated system appears to be in the range of about 8.0 to about 8.2 where the polymer would be highly deprotonated. The attraction to the calcium sites on the filler particles and to the adsorbed calcium ions present on the fiber and other furnish materials is very strong because of the double negative charge per phosphono pendant. Therefore, the flocculants according to the invention are highly suited for use as retention aids in the paper machines as well as for the clarification of effluents and the dewatering of effluent sludges in these types of paper mills. Among the additional uses in the paper industry is the clarification of circuit waters where calcium is added to cause soap-ink complexes to float.

EXAMPLES

The invention is further described and illustrated by the following detailed examples which are not intended to be limiting.

EXAMPLE 1 PREPARATION OF FLOCCULANT

A high molecular weight polyacrylamide-phosphonate flocculant according to the invention was prepared as follows:

An acrylamide polymer having a molecular weight of approximately 11,000,000 measured by an intrinsic viscosity of approximately 14 was dissolved in water to form a one weight percent (1 wt. %) solution.

One milliliter (ml) of the polyacrylamide solution and 0.4 ml of a one weight percent phosphorous acid solution were combined with 38.6 ml water and rapidly mixed for about one minute at a temperature of about 68° F. It is believed that approximately 40 mole percent of the phosphorous acid was converted to phosphono pendants on the polyacrylamide backbone.

EXAMPLE 2 FLOCCULANT ACTIVITY

The product of Example 1 was tested as a flocculant by comparing it to a very high molecular weight hydrolyzed acrylamide homopolymer having 40 mole % carboxyl sites. Solutions of all the polymers were made so that the final dilution contained 0.00025 wt. % solids. Accordingly, one milliliter contained about 0.0025 milligram (mg) polymer solids and one drop contained 0.000125 mg polymer solids. The pH of the final dilution water was adjusted to approximately 8.6 prior to mixing with the inventive polymer. The pH of the diluted flocculant of the invention was measured at approximately 8 immediately prior to its application to the slurry to be flocculated.

The samples tested were a standard dirt slurry augmented with calcium chloride, a repulped newsprint slurry with and without added calcium carbonate, a slurry of sodium-based coating clay to which calcium chloride had been added and a bleached fiber slurry containing calcium carbonate pigment as a filler at about pH 8.0. Three ml portions of the samples to be flocculated were added to 250 ml beakers. Because the flocculants of the invention are at their highest activity at pH ranges of about 7.7 and above, the samples were adjusted to approximately 8 to 8.2 pH before the flocculants were added.

Each flocculant was added drop-wise to a sample until good flocculation of the solids and good clarity of the supernatant were obtained.

The 40 mole percent high molecular weight polymer of the invention was found to be effective at one-third the dosage of the 40 mole percent hydrolysed polyacrylamide.

The foregoing detailed description is given for clearness of understanding only, and no unnecessary limitations are to be understood therefrom, as modifications within the scope of the invention will be apparent to those skilled in the art.

I claim:

1. A composition in an aqueous medium comprising an anionically modified acrylamide polymer formed by reacting an acrylamide polymer with phosphorous acid, said modified polymer having at least 5 mole percent phosphonate groups based on the acrylamide content of the acrylamide polymer and having a molecular weight of at least about 40,000, the pH of said composition being adjusted to at least about 7.7.

2. The composition of claim 1 wherein said acrylamide polymer is an acrylamide homopolymer.

3. The composition of claim 1 having a molecular weight ranging from about 5,000,000 to about 11,000,000.

4. The composition of claim 1 having a molecular weight of approximately 11,000,000.

5. The composition of claim 1 further prepared by dilution with water after said reaction, the pH of said water being adjusted prior to dilution to result in a diluted product having a pH of at least about 7.7.

6. The diluted composition of claim 5 having a pH of about 8.0 to about 8.2.

7. A process for the preparation of a water treatment composition in an aqueous medium comprising an anionically modified acrylamide polymer formed by reacting an acrylamide polymer with phosphorous acid, said modified polymer having at least 5 mole percent phosphonate groups based on the acrylamide content of the acrylamide polymer and having a molecular weight of from about 40,000 to about 18,000,000, the pH of said composition being adjusted to at least about 7.7.

8. The process of claim 7 wherein the pH of the composition is adjusted by adding thereto a compound selected from the group consisting of sodium hydroxide and potassium hydroxide.

9. The process of claim 7 further comprising the step of diluting said composition with water, the pH of said water being adjusted prior to dilution to result in a diluted product having a pH of at least about 7.7.

10. The process of claim 9 wherein said diluted composition has a pH of about 8 to about 8.2.

11. The process of claim 7 wherein the composition has a molecular weight of about 5,000,000 to about 11,000,000.

12. A composition in an aqueous medium comprising an anionically modified acrylamide polymer formed by reacting an acrylamide polymer and phosphorous acid, said modified polymer having at least about 5 mole percent phosphonate groups based on the acrylamide content of the acrylamide polymer and having a molecular weight of from about 40,000 to about 18,000,000, said modified polymer further prepared by dilution with water after said reaction, the pH of said water being adjusted prior to dilution to result in a diluted product having a pH of approximately 7.7 to about 8.4.

13. The diluted composition of claim 12 having a pH of about 8.0 to about 8.2.

14. A process for the preparation of a water treatment composition in an aqueous medium comprising an anionically modified acrylamide polymer formed by reacting an acrylamide polymer with phosphorous acid, said modified polymer having at least about 5 mole percent phosphonate groups based on the acrylamide content of the acrylamide polymer and having a molecular weight of from about 40,000 to about 18,000,000, and then diluting the resulting composition with water, the pH of said water being adjusted prior to dilution to result in a diluted product having a pH of approximately 7.7 to about 8.4.

15. The process of claim 14 wherein said diluted composition has a pH of about 8 to about 8.2.

16. The process of claim 7 wherein the pH is adjusted to from about 7.7 to about 8.4.

17. The process of claim 16 wherein the pH of the composition is adjusted by adding thereto a compound selected from the group consisting of sodium hydroxide and potassium hydroxide.

* * * * *

UNITED STATES PATENT AND TRADEMARK OFFICE
CERTIFICATE OF CORRECTION

PATENT NO. : 5,342,539
DATED : August 30, 1994
INVENTOR(S) : Leo E. Nagan

It is certified that error appears in the above-indentified patent and that said Letters Patent is hereby corrected as shown below:

Title page, Abstract, line 1, "Artionic" should be --Anionic--.

Column 1, line 23, "Artionic" should be --Anionic--.

Column 1, line 58, after "cooling" delete "f".

Column 3, line 58, "polyacrylamidephosphonate" should be --polyacrylamide-phosphonate--.

Column 4, line 28, after "200 mole" insert --%--.

Column 4, line 40, after "about" insert --7.7--.

Signed and Sealed this

Twenty-seventh Day of December, 1994

Attest:

BRUCE LEHMAN

*Attesting Officer*     *Commissioner of Patents and Trademarks*